(12) United States Patent
Suh et al.

(10) Patent No.: US 8,077,572 B2
(45) Date of Patent: *Dec. 13, 2011

(54) RECORDING MEDIUM WITH RESTRICTED PLAYBACK FEATURE AND APPARATUS AND METHODS FOR FORMING, RECORDING, AND REPRODUCING THE RECORDING MEDIUM

(75) Inventors: Sang Woon Suh, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 38 days.

This patent is subject to a terminal disclaimer.

(21) Appl. No.: 10/789,992

(22) Filed: Mar. 2, 2004

(65) Prior Publication Data

US 2004/0233809 A1 Nov. 25, 2004

Related U.S. Application Data

(63) Continuation of application No. PCT/KR03/01292, filed on Jul. 1, 2003.

(30) Foreign Application Priority Data

Jul. 2, 2002 (KR) .................. 10-2002-0037947
Sep. 10, 2002 (KR) .................. 10-2002-0054762

(51) Int. Cl.
*G11B 7/007* (2006.01)
(52) U.S. Cl. .................. 369/53.21; 369/275.3
(58) Field of Classification Search ............... 369/47.54, 369/275.3, 53.21, 272.1, 275.4; *G11B 7/00, G11B 20/10, 10/20, 7/24*
See application file for complete search history.

(56) References Cited

U.S. PATENT DOCUMENTS

| | | | |
|---|---|---|---|
| 4,748,609 A | 5/1988 | Yonezawa et al. | |
| 4,907,216 A | 3/1990 | Rijnsburger | |
| 5,051,998 A | 9/1991 | Murai et al. | |
| 5,513,260 A | 4/1996 | Ryan | |
| 5,538,773 A | 7/1996 | Kondo | |
| 5,563,872 A * | 10/1996 | Horimai | 369/275.4 |
| 5,572,507 A * | 11/1996 | Ozaki et al. | 369/53.21 |
| 5,623,505 A | 4/1997 | Funamoto et al. | |
| 5,706,047 A | 1/1998 | Lentz et al. | |
| 5,706,268 A | 1/1998 | Horimai | |
| 5,724,327 A | 3/1998 | Timmermans et al. | |
| 5,737,286 A * | 4/1998 | Timmermans et al. | 369/44.13 |
| 5,809,007 A * | 9/1998 | Takemura et al. | 369/275.3 |

(Continued)

FOREIGN PATENT DOCUMENTS

CN 1313599 9/2001

(Continued)

OTHER PUBLICATIONS

Chinese Office Action dated Mar. 2, 2007 with English translation.

(Continued)

*Primary Examiner* — Wayne Young
*Assistant Examiner* — Thomas Alunkal
(74) *Attorney, Agent, or Firm* — Harness, Dickey & Pierce

(57) ABSTRACT

A recording medium, such as a high-density and/or read-only recording medium, such as BD-ROM, capable of preventing unauthorized duplication of data streams, written thereon, onto another medium, such as a BD-RE or BD-R, which includes physical mark information, and to methods and apparatuses for forming, recording, reproducing, and restricting playback of the recording medium to prevent unauthorized duplication.

12 Claims, 10 Drawing Sheets

U.S. PATENT DOCUMENTS

| | | | |
|---|---|---|---|
| 5,936,933 A | 8/1999 | Miyamoto et al. | |
| 5,940,364 A | 8/1999 | Ogata et al. | |
| 6,014,348 A | 1/2000 | Kim | |
| 6,070,799 A | 6/2000 | Ashe | |
| 6,081,785 A * | 6/2000 | Oshima et al. | 705/1 |
| 6,128,272 A | 10/2000 | Horimai et al. | |
| 6,137,758 A | 10/2000 | Nemoto | |
| 6,144,625 A | 11/2000 | Kuroda et al. | |
| 6,208,600 B1 | 3/2001 | Kimura et al. | |
| 6,266,299 B1 | 7/2001 | Oshima et al. | |
| 6,330,215 B1 | 12/2001 | Lim | |
| 6,353,890 B1 * | 3/2002 | Newman | 713/193 |
| 6,532,206 B2 * | 3/2003 | Muramatsu et al. | 369/275.3 |
| 6,535,477 B1 | 3/2003 | Muramatsu et al. | |
| 6,546,490 B2 * | 4/2003 | Sako et al. | 713/193 |
| 6,549,498 B1 | 4/2003 | Inoue et al. | |
| 6,580,678 B2 | 6/2003 | Kondo et al. | |
| 6,580,682 B1 | 6/2003 | Kamperman et al. | |
| 6,603,720 B1 | 8/2003 | Kuroda et al. | |
| 6,603,732 B2 | 8/2003 | Tosaki et al. | |
| 6,608,804 B2 * | 8/2003 | Shim | 369/53.22 |
| 6,671,249 B2 | 12/2003 | Horie | |
| 6,683,844 B2 * | 1/2004 | Kuroda | 369/275.2 |
| 6,694,023 B1 | 2/2004 | Kim | |
| 6,707,774 B1 * | 3/2004 | Kuroda et al. | 369/53.21 |
| 6,707,785 B1 | 3/2004 | Kato | |
| 6,747,931 B1 | 6/2004 | Park | |
| 6,930,977 B1 * | 8/2005 | Kondo et al. | 369/275.4 |
| 7,012,859 B2 | 3/2006 | Park | |
| 7,014,815 B1 | 3/2006 | Worthington et al. | |
| 7,028,011 B1 * | 4/2006 | Ha et al. | 705/57 |
| 7,035,172 B1 | 4/2006 | Murata | |
| 7,050,383 B2 | 5/2006 | Nakajima et al. | |
| 7,061,850 B1 | 6/2006 | Irie et al. | |
| 7,072,260 B1 | 7/2006 | Sako et al. | |
| 7,215,610 B2 * | 5/2007 | Sako et al. | 369/47.12 |
| 7,280,461 B2 | 10/2007 | Endoh | |
| 7,302,588 B2 | 11/2007 | Sako et al. | |
| 2001/0007545 A1 * | 7/2001 | Ueda et al. | 369/47.15 |
| 2001/0014077 A1 | 8/2001 | Muramatsu et al. | |
| 2001/0038603 A1 | 11/2001 | Kondo et al. | |
| 2001/0049662 A1 | 12/2001 | Linnartz et al. | |
| 2001/0054028 A1 | 12/2001 | Kuroda et al. | |
| 2002/0001274 A1 | 1/2002 | Nakajima et al. | |
| 2002/0015379 A1 * | 2/2002 | Yamaguchi et al. | 369/275.3 |
| 2002/0021635 A1 | 2/2002 | Park et al. | |
| 2002/0024898 A1 | 2/2002 | Kamiyama | |
| 2002/0024914 A1 | 2/2002 | Kobayashi | |
| 2002/0027855 A1 | 3/2002 | Shishido et al. | |
| 2002/0060968 A1 | 5/2002 | Senshu | |
| 2002/0110067 A1 | 8/2002 | Kondo et al. | |
| 2002/0145947 A1 | 10/2002 | Minamino et al. | |
| 2002/0181705 A1 * | 12/2002 | Sako | 380/201 |
| 2003/0002427 A1 | 1/2003 | Lee et al. | |
| 2003/0002430 A1 | 1/2003 | Kim et al. | |
| 2003/0012098 A1 * | 1/2003 | Sako et al. | 369/47.12 |
| 2003/0048705 A1 | 3/2003 | Wang et al. | |
| 2003/0067849 A1 | 4/2003 | Mikami | |
| 2003/0112736 A1 | 6/2003 | Muramatsu et al. | |
| 2003/0218950 A1 * | 11/2003 | Yamada | 369/53.21 |
| 2004/0001414 A1 * | 1/2004 | Kadowaki et al. | 369/59.24 |
| 2005/0111315 A1 | 5/2005 | Hwang et al. | |
| 2005/0213483 A1 | 9/2005 | Tomita et al. | |

FOREIGN PATENT DOCUMENTS

| | | |
|---|---|---|
| CN | 1384491 | 12/2002 |
| EP | 0 545 472 | 6/1993 |
| EP | 0 723 216 | 7/1996 |
| EP | 0 299 573 | 1/1998 |
| EP | 0 936 610 | 8/1999 |
| EP | 1 065 659 | 1/2001 |
| EP | 1 081 688 | 3/2001 |
| EP | 1 158 499 | 11/2001 |
| EP | 1 168 312 A1 | 1/2002 |
| EP | 1 189 213 A2 | 3/2002 |
| EP | 1 296 328 A1 | 3/2003 |
| EP | 1 126 446 | 11/2007 |
| JP | 04/274032 | 9/1992 |
| JP | 05-182368 | 7/1993 |
| JP | 5-266593 | 10/1993 |
| JP | 6-337763 | 6/1994 |
| JP | 06-275044 | 9/1994 |
| JP | 07-085574 | 3/1995 |
| JP | 08-036803 | 2/1996 |
| JP | 08-087760 | 4/1996 |
| JP | 09-305396 | 11/1997 |
| JP | 10-143866 | 5/1998 |
| JP | 10/172149 | 6/1998 |
| JP | 10-177767 (A) | 6/1998 |
| JP | 10/222874 | 8/1998 |
| JP | 10/302381 | 11/1998 |
| JP | 10/326419 | 12/1998 |
| JP | 10-334574 | 12/1998 |
| JP | 11/032328 | 2/1999 |
| JP | 11-102572 | 4/1999 |
| JP | 11/339268 | 12/1999 |
| JP | 2000/076141 | 3/2000 |
| JP | 2000/113466 | 4/2000 |
| JP | 2000/123479 | 4/2000 |
| JP | 2000-149414 | 5/2000 |
| JP | 2000/231722 | 11/2000 |
| JP | 2000-315355 | 11/2000 |
| JP | 2001/014796 | 1/2001 |
| JP | 2001/135021 | 5/2001 |
| JP | 2001-155410 | 6/2001 |
| JP | 2001-189015 | 7/2001 |
| JP | 2001-216727 | 8/2001 |
| JP | 2001-229547 | 8/2001 |
| JP | 2001-256655 | 9/2001 |
| JP | 2001-319339 | 11/2001 |
| JP | 2001/325747 | 11/2001 |
| JP | 2001-332031 (A) | 11/2001 |
| JP | 2002/132457 | 5/2002 |
| JP | 2002-182770 | 6/2002 |
| JP | 2002-319245 | 10/2002 |
| JP | 2003/329731 | 11/2003 |
| KR | 10/1999/0079395 | 4/1998 |
| KR | 100239468 | 1/2000 |
| KR | 10-0275870 | 1/2001 |
| KR | 10/2001/0088053 | 9/2001 |
| KR | 2001-0085952 | 12/2001 |
| KR | 2003/004542 | 1/2003 |
| KR | 2003/030506 | 4/2003 |
| TW | 346571 | 12/1998 |
| TW | 452766 | 9/2001 |
| TW | 514874 | 12/2002 |
| WO | WO 00/45381 | 8/2000 |
| WO | WO 01/11890 A1 | 2/2001 |
| WO | WO0115164 | 3/2001 |
| WO | WO 02/037493 | 10/2001 |
| WO | WO 0188917 | 11/2001 |
| WO | WO 01/95327 A2 | 12/2001 |
| WO | WO 02/01560 A1 | 1/2002 |
| WO | WO 02/37493 * | 5/2002 |
| WO | WO 03/094158 A1 | 11/2003 |
| WO | WO 2004/066283 | 8/2004 |

OTHER PUBLICATIONS

European Search Report dated Feb. 17, 2006.
Memorex, White Paper Reference Guide Optical Media, Mar. 24, 2006.
Philips Electronics; Formatter for Prerecorded Formats, 2004.
Philips Electronics; Formatter for Recordable/Rewritable Format, 2004.
Internet posting, Understanding the Design of the DVD+RW and DVD+R Disc Format., 2008.
Addressing Schemes for Optical Discs dated Apr. 3, 2008.
International Search Report dated Aug. 22, 2003.
International Search Report dated Oct. 23, 2003.
International Search Report dated May 27, 2004.
Chinese Office Action dated Mar. 17, 2006.
Japanese Office Action dated Nov. 20, 2006 for JP Application No. 2004-502291.
Japanese Search Report dated May 23, 2007 for JP Application No. 2004-502291.

Russian Office Action dated Sep. 14, 2007 (Jul. 6, 2007).
European Search Report dated Oct. 26, 2007.
Chinese Office Action dated Dec. 7, 2007.
Japanese Office Action dated Feb. 6, 2008.
Japanese Office Action dated Jun. 3, 2008 2005/214336.
Korean Office Action dated May 30, 2008 10/2002/0023983.
European Search Report dated Mar. 25, 2008.
European Search Report dated Mar. 14, 2008.
Korean Office Action dated Jul. 22, 2008.
Russian Office Action dated Feb. 28, 2008.
Korean Office Action dated Sep. 17, 2008—10-2002-0037947.
Japanese Office Action dated Sep. 24, 2008— JP2005-214336.
Japanese Office Action issued Mar. 10, 2009.
Yoshiyuki Kaneda, "Advanced Optical Disk Mastering and Its Application for Extremely High-Density Magnetic Recording," IEEE Transactions on Industrial Electronics, vol. 42, No. 3, Jun. 1995.
Isao Satoh, "Key Technology for High Density Rewritable DVD (DVD-RAM)," IEEE Transactions on Magnetics, vol. 34, No. 2, Mar. 1998.
Hiroshi Fuji, "Recording and Readout Using Clock Marks Premastered by Groove Wobbling," IEEE Transactions on Magnetics, vol. 36, No. 3, May 2000.
Office Action for corresponding Japanese Application No. 2005-210963 dated Jul. 14, 2009.
Office Action for corresponding Korean Application No. 10-2002-0077358 dated Jul. 16, 2009.
Office Action for corresponding Japanese Application No. 2006-502712 dated Sep. 1, 2009.
Office Action for corresponding U.S. Appl. No. 10/986,019 dated Mar. 23, 2009.
Office Action for corresponding U.S. Appl. No. 10/986,019 dated Aug. 25, 2009.
Office Action for corresponding Korean Application No. 10-2003-0073800 dated Mar. 17, 2010.
Office Action for corresponding Japanese Application No. 2004-502291 dated Mar. 23, 2010.
Office Action for corresponding Taiwanese Application No. 093104152 dated Oct. 13, 2010.
Office Action for corresponding Taiwanese Application No. 093127674 dated Oct. 18, 2010.
Office Action for corresponding Japanese Application No. 2004-519328 dated Nov. 24, 2010.
Office Action for corresponding Japanese Application No. 2006-502712 dated Jul. 30, 2010.
Office Action for corresponding Japanese Application No. 2005-210963 dated Mar. 1, 2011.
Office Action for corresponding U.S. Appl. No. 10/989,292 dated Mar. 16, 2011.
Office Action dated Sep. 2, 2011 by the Japanese Patent Office for Japanese Patent Office for Japanese Application No. JP 2006-502712.
Notice of Allowance issued by the Korean Patent Office on Jul. 12, 2011.
European Search Report issued by the European Patent Office on Aug. 4, 2011.

* cited by examiner

Physical BD-ROM ID Mark
( Wobbled Pit Type )

FIG. 7

|  | BD-RE | BD-ROM | BD-R for authoring | BD-R |
|---|---|---|---|---|
| Pre-recorded Area (PIC area) | HFM Groove | Wobble Pit or Normal Pit | Monotone HFM Groove & Normal Pit | Wobbled Pit |
| Writable Area | Wobbled Groove | Normal Pit | Wobbled Groove | Wobbled Groove |

RECORDING MEDIUM WITH RESTRICTED PLAYBACK FEATURE AND APPARATUS AND METHODS FOR FORMING, RECORDING, AND REPRODUCING THE RECORDING MEDIUM

CROSS-REFERENCE TO RELATED APPLICATIONS

This U.S. nonprovisional application is a continuation of PCT International Application No. PCT/KR2003/001292 filed on Jul. 1, 2003, the entire contents of which are hereby incorporated by reference, which further claims priority on Korean Patent Application No. 10-2002-0037947, filed on Jul. 2, 2002 and Korean Patent Application No. 10-2002-0054762 filed on Sep. 10, 2002, the entire contents of each which are also hereby incorporated by reference.

BACKGROUND OF THE INVENTION

1. Field of the Invention

The present invention relates to a recording medium such as BD-ROM (Blu-ray Disc ROM) which has a capability to restrict unauthorized duplication of data written therein, which includes physical mark information and an apparatus and methods for forming, recording, reproducing, and restricting reproduction of illegally duplicated recording media.

2. Description of the Related Art

Recently, standardization of new high-density rewritable optical discs has rapidly progressed, for example, BD-RE (Blu-Ray Disc Rewritable), which can store a large quantity of high-quality video and audio data. As a result, products associated with such discs have also been developed. Such products are expected to be commercially available in the near future.

Referring to FIG. 1, the disc structure of a conventional BD-RE is shown. As shown in FIG. 1, the BD-RE has a center hole and a clamping area which are adapted to allow the optical disc to be loaded in position in an optical disc apparatus. The optical disc also has an information area for recording disc management information and data thereon.

A lead-in area (LI), a data area, and a lead-out area (LO) are assigned to the information area. A burst cutting area (BCA) is assigned to the area preceding the lead-in area. The BCA, which is not a writable area, contains information modulated into a format unique to BD-RE.

Referring to FIG. 2, an example of an optical disc apparatus applicable to BD-RE is shown. As shown in FIG. 2, the optical disc apparatus includes an optical pickup 10, a video disc recorder (VDR) system 11, and an encoder 12. The optical disc apparatus performs a data recording operation for encoding and modulating data, externally input thereto, into a format unique to BD-RE, and then recording the modulated data on a data area assigned to the information area of the BD-RE. The optical disc apparatus also performs a data reproduction operation for reading out data recorded on the data area, and processing the read-out data to reproduce original video and audio data.

The optical disc apparatus having the above-mentioned configuration can record audio/video (A/V) data of a movie or broadcasted program on a BD-RE optical disc 100, and subsequently reproduce the recorded A/V data from the BD-RE optical disc 100 in the form of high-quality video and audio.

The development and standardization of high-density read-only optical discs, such as BD-RE and its read-only counterpart, BD-ROM (Blu-ray Disc Read-Only Memory), and write-once Blu-ray discs such as BD-R (Blu-ray Disc Recordable) have recently been progressing. However, there is no effective solution for preventing unauthorized duplication of data streams, written on a BD-ROM, or onto other optical discs, such as BD-RE or BD-R.

SUMMARY OF THE INVENTION

In exemplary embodiments, the present invention is directed to a recording medium, such as a high-density and/or read-only recording medium, such as BD-ROM, capable of preventing unauthorized duplication of data streams, written thereon, onto another medium, such as a BD-RE or BD-R, and to methods and apparatuses for forming, recording, reproducing, and restricting playback of the recording medium to prevent unauthorized duplication.

In exemplary embodiments, the present invention is directed to a recording medium, such as a high-density and/or read-only recording medium, such as BD-ROM, capable of preventing unauthorized duplication of data streams, written thereon, onto another medium, such as a BD-RE or BD-R, which includes physical mark information and to methods and apparatuses for forming, recording, reproducing, and restricting playback of the recording medium to prevent unauthorized duplication.

In an exemplary embodiment, the present invention is directed to a recording medium including recorded data, the recording medium including an information area for recording disc management information and/or data, the information area includes a lead-in area, a data area, and a lead-out area and physical mark information, recorded as a wobbled pit pattern in an area preceding the lead-in area, in the lead-in area, in the data area, in the lead-out area, or in an area following the lead-out area of the information area.

In another exemplary embodiment, the present invention is directed to a method of forming a recording medium, including forming an information area for recording disc management information and/or data, the information area includes a lead-in area, a data area, and a lead-out area and forming physical mark information as a wobbled pit pattern in an area preceding the lead-in area, in the lead-in area, in the data area, in the lead-out area, or in an area following the lead-out area of the information area of the information area.

In another exemplary embodiment, the present invention is directed to a method of reproducing data from a recording medium, including utilizing physical mark information to control reproduction of the recorded data, wherein physical mark information has been recorded as a wobbled pit pattern in an area of the recording medium In another exemplary embodiment, the present invention is directed to a method of recording data on a recording medium, including recording the data in an information area, which includes a lead-in area, a data area, and a lead-out area and recording physical mark information as a wobbled pit pattern in an area of the information area, which controls reproduction of the recorded data.

In another exemplary embodiment, the present invention is directed to an apparatus for reproducing data from a recording medium, the apparatus utilizing physical mark information to control reproduction of the recorded data, wherein the physical mark information has been recorded as a wobbled pit pattern in an area of the recording medium.

BRIEF DESCRIPTION OF THE DRAWINGS

Features and advantages of the exemplary embodiments of the present invention will become more apparent after reading the following detailed description when taken in conjunction with the drawings, in which:

FIG. 7 is a table for comparing data recording formats of BD-ROM, BD-RE, BD-R, and BD-R for authoring;

DETAILED DESCRIPTION OF EXEMPLARY EMBODIMENTS

Hereinafter, exemplary embodiments of a recording medium, such as a high-density and/or optical disc according to the present invention, and an apparatus and a method for forming, recording, reproducing, and restricting playback of the high-density optical disc in accordance with the present invention will be described in detail with reference to the attached drawings.

Figure 3:
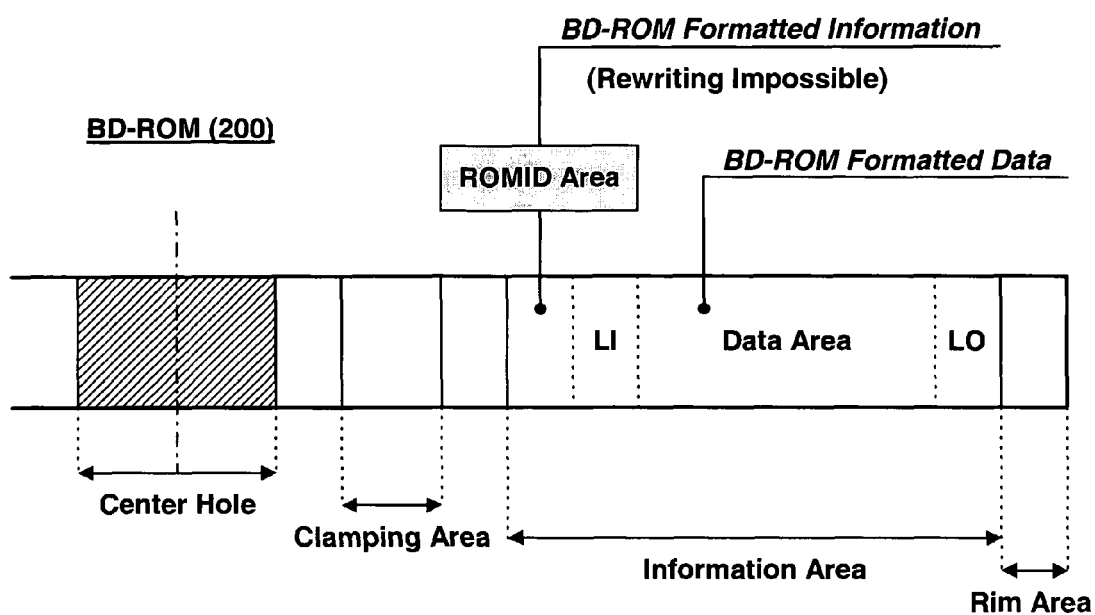
FIG. 3 is a diagram illustrating the disc structure of a BD-ROM according to an exemplary embodiment of the present invention.

Referring to FIG. 3, the disc structure of a BD-ROM according to an exemplary embodiment of the present invention is shown. As shown in FIG. 3, the BD-ROM 200 has a center hole and a clamping area which are adapted to allow the BD-ROM 200 to be loaded in position in an optical disc apparatus. The BD-ROM 200 also has an information area on which disc management information and data have been recorded.

Figure 1:
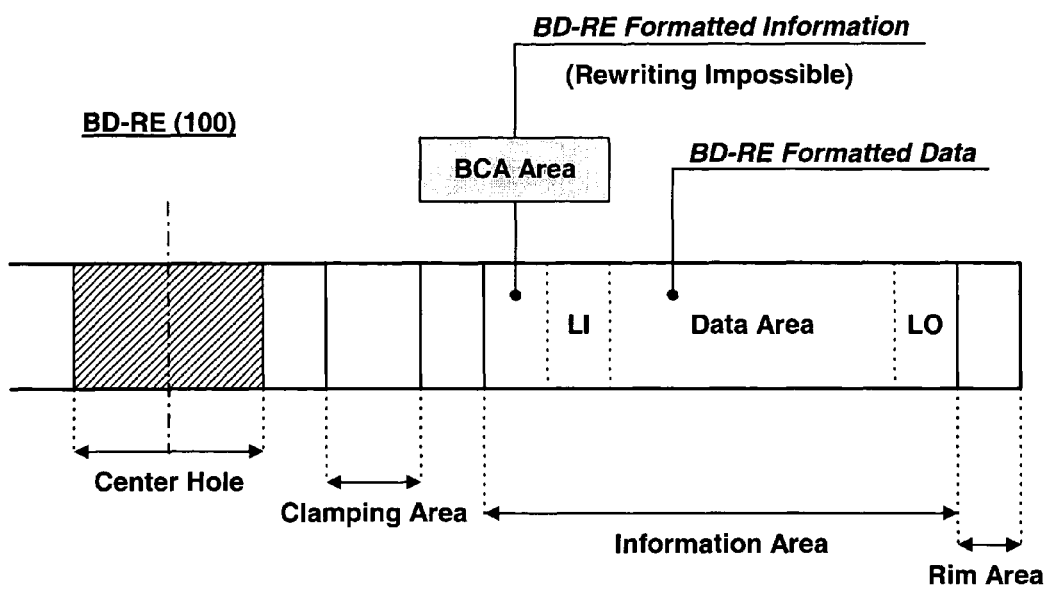
FIG. 1 is a diagram illustrating the disc structure of a conventional BD-RE.
Figure 2:
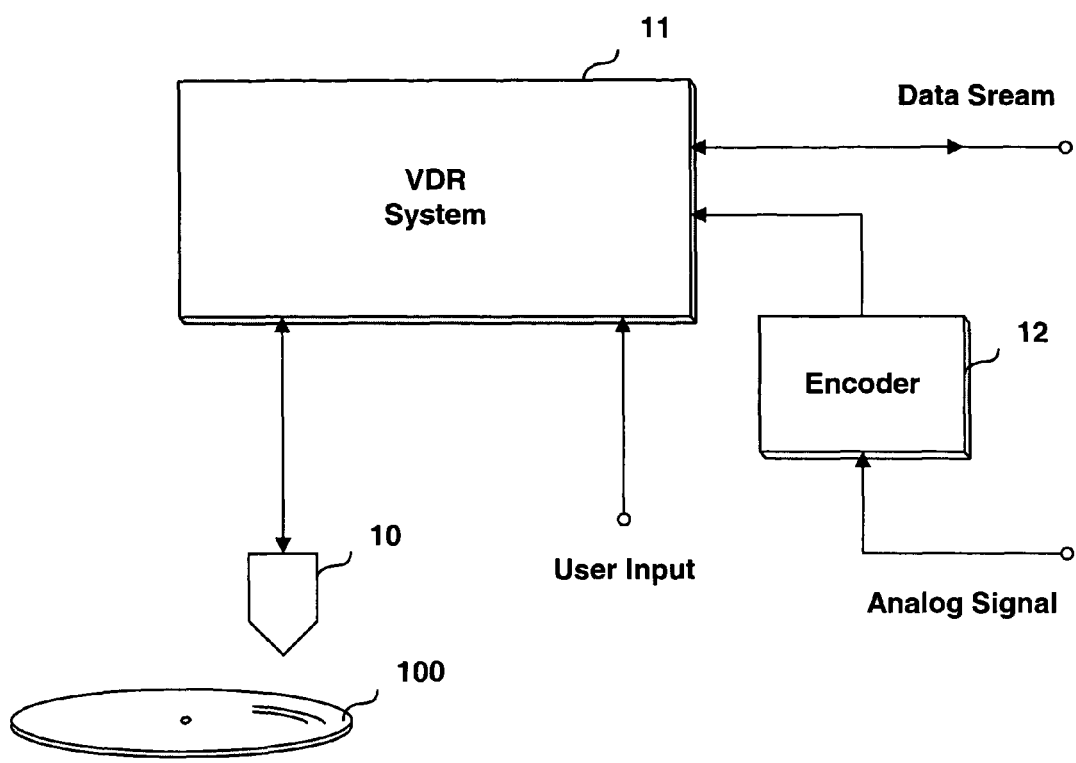
FIG. 2 is a schematic block diagram illustrating the configuration of a conventional BD-RE recorder.

A lead-in area (LI), a data area, and a lead-out area (LO) may be assigned to the information area. A disc identification area, for example, a 'BD-ROM identification (ROMID)' area, can be assigned to the area preceding the lead-in area (LI). The ROMID area may correspond to the BCA of the BD-RE described with reference to FIG. 1. The ROMID area also can be assigned to a particular region of the lead-in (LI) or lead-out area (LO).

The ROMID area, which is not a writable area, may contain identification information indicating that the associated disc is of a BD-ROM type. This identification information can be modulated and recorded into a format unique to BD-ROM, for example, a physical BD-ROM ID mark.

Figure 4:
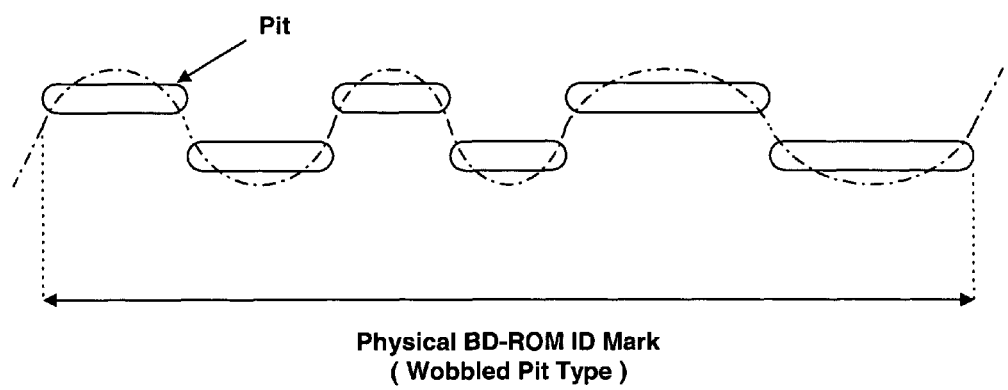
FIG. 4 is a schematic view illustrating physical disc identification information recorded in the form of a wobbled pit pattern in accordance with an exemplary embodiment of the present invention.

As shown in FIG. 4, the physical BD-ROM ID mark can be recorded in the form of a wobbled pit pattern. The physical BD-ROM ID mark can be detected at an initial stage of a servo operation, independent of a decoding operation for reproducing data. The wobbled pit pattern of the physical BD-ROM ID mark can represent an encryption key value used in encrypting the data to be written on the data area, for example, duplication preventing information.

Data encoded and modulated into a format unique to BD-ROM is recorded on the data area assigned to the information area. This data is written in a mastering process during the manufacture of the associated disc.

Figure 5:
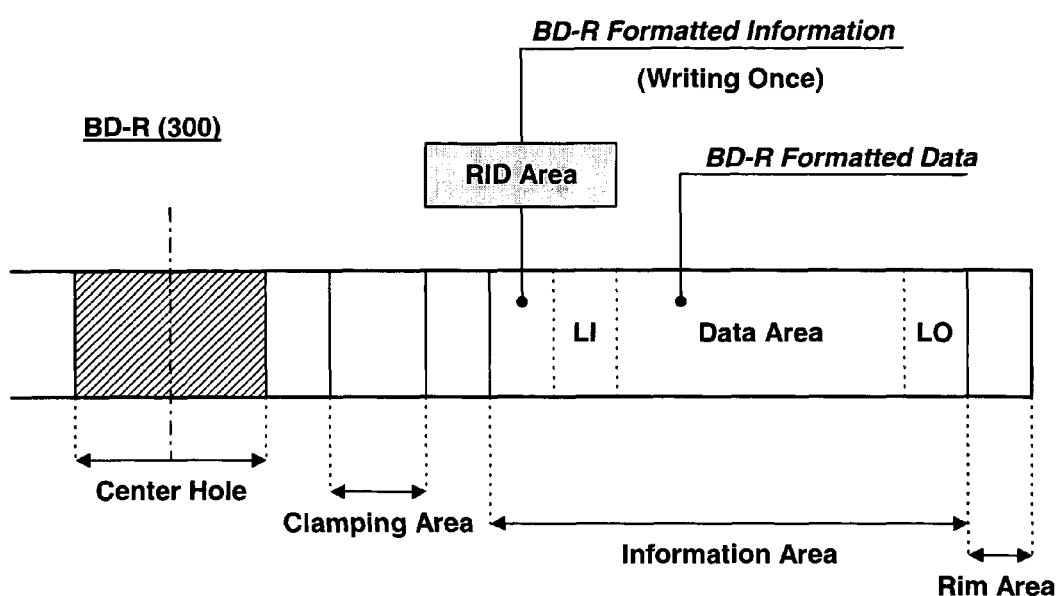
FIG. 5 is a diagram illustrating the disc structure of a BD-R according to an exemplary embodiment of the present invention.

FIG. 5 illustrates the disc structure of a Blu-ray write-once, that is, BD-R, in accordance with an exemplary embodiment of the present invention. As shown in FIG. 5, the BD-R 300 has a center hole and a clamping area which are adapted to allow the BD-R 300 to be loaded in position in an optical disc apparatus. The BD-R 300 also has an information area for recording disc management information and data thereon.

A lead-in area (LI), a data area, and a lead-out area (LO) may be assigned to the information area. A disc identification area, for example, a 'BD-R identification (RID)' area, also can be assigned to the area preceding the lead-in area. The RID area may correspond to the BCA of the BD-RE described with reference to FIG. 1.

The RID area, which is a writable area, may contain identification information representing the fact that the associated disc is of a BD-R type. The identification information can be modulated and recorded into a format unique to BD-R, that is, a physical BD-R ID mark.

The physical mark can also recorded in the form of a wobbled pit pattern, as shown in FIG. 4. The physical BD-R ID mark can be detected at the initial stage of a servo operation, independent of a decoding operation for reproducing data.

The physical mark can also be recorded in the form of a pit pattern other than the wobbled pit pattern. Using a physical mark having a pit pattern other than the wobbled pit pattern, it is possible to write data on the data area in an encrypted state, and to decrypt the encrypted data read out from the data area. This is described in more detail below.

Physical mark information, which is recorded on a desired recording area, for example, a lead-in area or a particular area (ROMID or RID area) preceding the lead-in area, in a BD-ROM or a BD-R authored for manufacture of BD-ROM, can be written to have a pattern of repeated mark/space pairs with respect to a monotone high-frequency-modulated (HFM) groove. Each mark/space pair may include a mark and a space each having an optional length.

Figure 6:
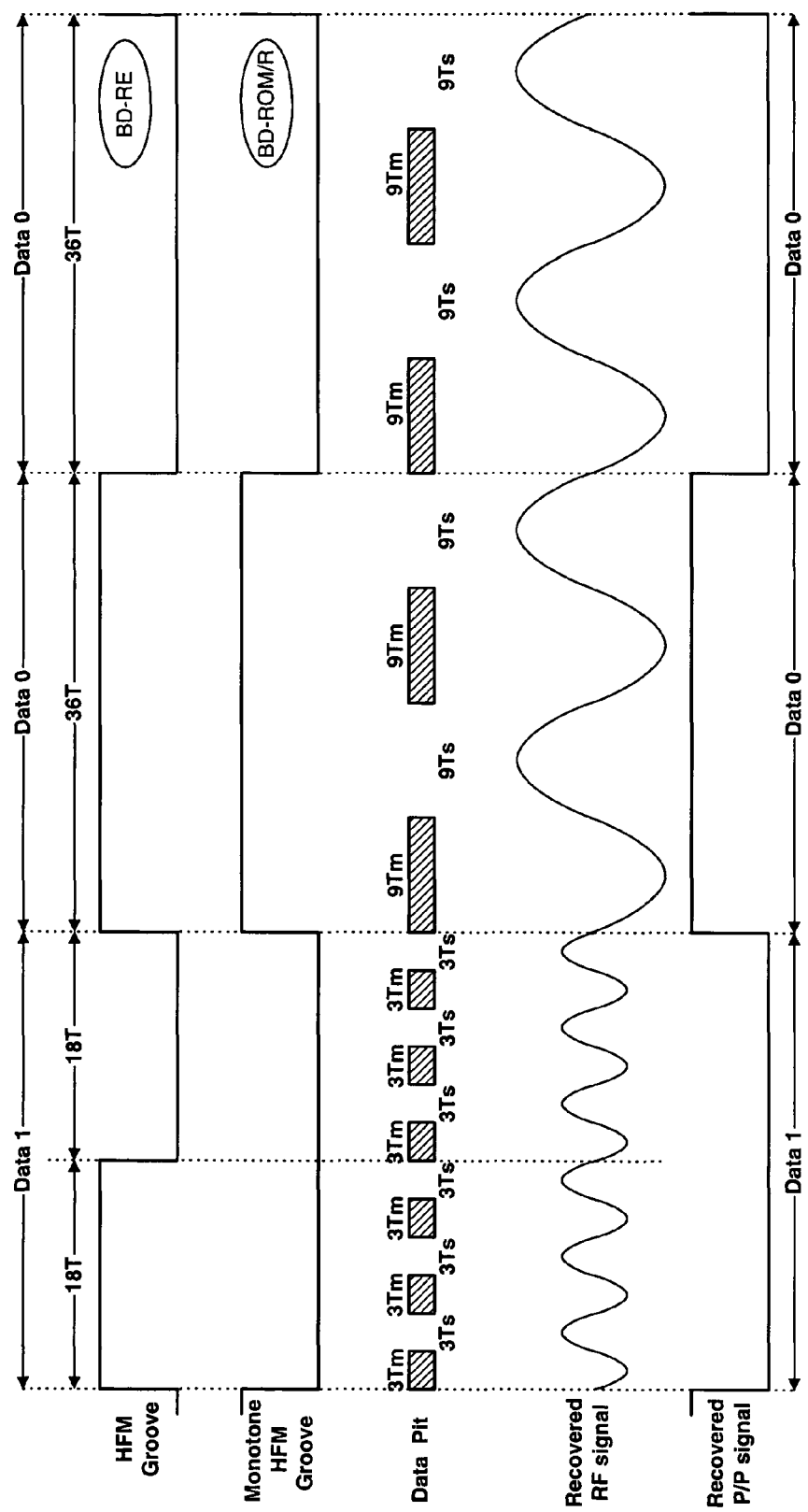
FIG. 6 is a schematic view illustrating physical disc identification information recorded in the form of aligned pit strings in accordance with an exemplary embodiment of the present invention.

For example, as shown in FIG. 6, the physical mark information may be written with respect to a monotone HFM groove in which every recording field having a length of 36T has either a high level or a low level, irrespective of the data sequence value of the physical mark information. Where the data value of a 36T recording field is "1", a mark/space pair including a mark having a length of 3T (3Tm) and a space having a length of 3T (3Ts) may be repeatedly recorded 6 times in the 36T recording field to form a pattern of 6 aligned mark/space pairs. Where the data value of the 36T recording field is "0", a mark/space pair including a mark having a length of 9T (9Tm) and a space having a length of 9T (9Ts) may be repeatedly recorded 2 times in the 36T recording field to form a pattern of 2 aligned mark/space pairs.

In the latter case, where the data value of the 36T recording field is "0", a mark having a length of 12T (12Tm), a space having a length of 12T (12Ts), and a mark having a length of 12T (12Tm) may be sequentially recorded in the 36T recording field. In this case, however, errors may occur during a tracking servo operation, because the frequencies of RF and push-pull signals may be lowered due to the 12T length of the marks and space. In another exemplary embodiment, repeated mark/space pairs are recorded each including a mark of 9T (9Tm) and a space of 9T (9Ts) which are capable of maintaining respective RF and push-pull signals at appropriate frequencies.

Where physical mark information is recorded to have a wobbled pit pattern, as described above with reference to FIG. 4, the wobbled pits can be formed using mastering equipment adapted to manufacture BD-ROMs. However, such wobbled pits cannot be recorded in general disc drivers, for example, BD-R drivers, because the wobbling frequency is beyond the driving frequency band of an actuator used in BD-R drivers. As a result, it is impossible to duplicate BD-ROMs, using BD-R drivers.

In other words, in a BD-R authored for manufacture of BD-ROM, that is, a BD-R for authoring, it is possible not only to record physical mark information, but also to record essential disc information (DI) to be permanently recorded and maintained in an area, such as a permanent information & control (PIC) data region included in the lead-in area of the BD-R, by applying a recording technique in which repeated mark/space pairs, each including a mark and a space, each having an optional length, are recorded such that they are aligned with one another, with respect to a monotone HFM groove. On the other hand, recording of data in the writable area of the BD-R is achieved with respect to each typical wobbled groove.

In the case of BD-ROM, wobbled pits or normal pits can be recorded in the area, such as the PIC region of the BD-ROM, whereas data having the form of general pit strings is recorded in the data recording area of the BD-ROM. Accordingly, optical disc apparatuses can more easily distinguish the type of any optical disc, for example, BD-RE or general BD-R, by referring to a pit string recorded in the form of a unique pattern in an area, such as the PIC region of the optical disc.

Figure 8:
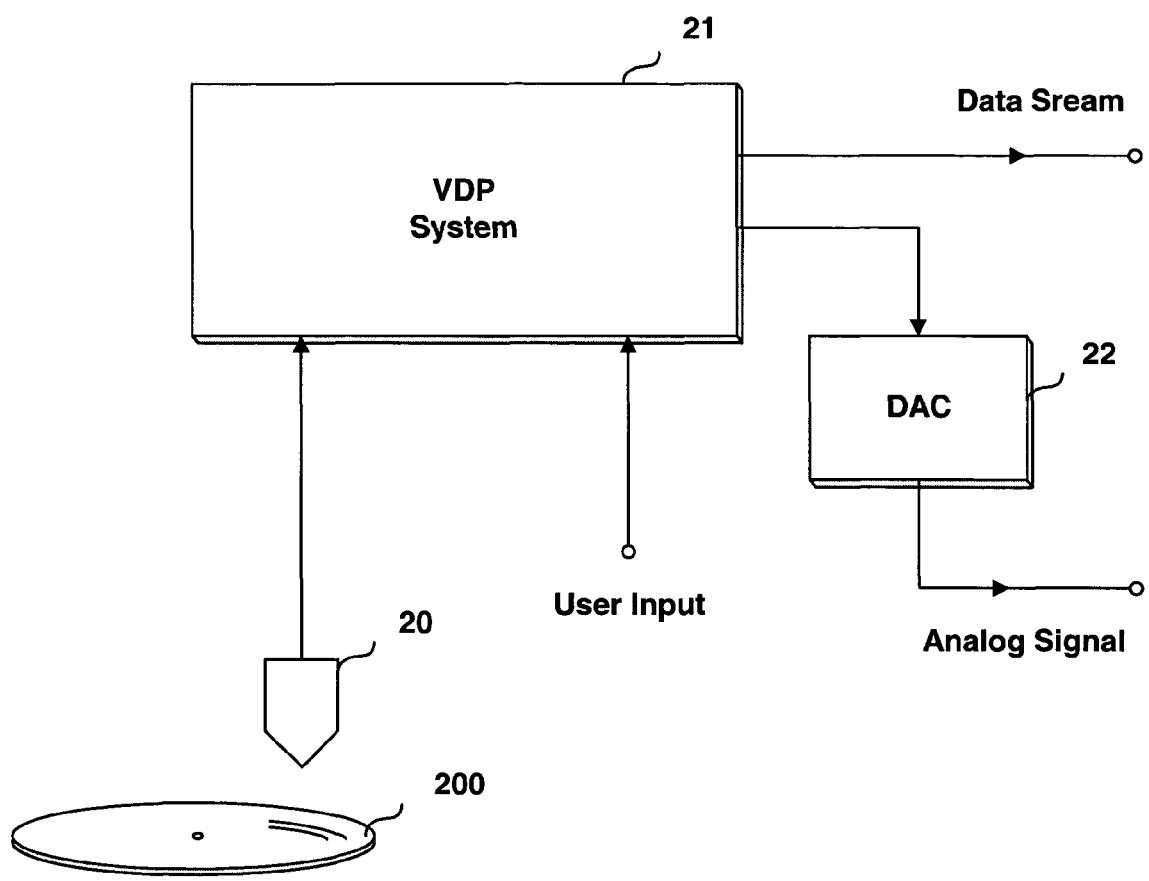
FIG. 8 is a schematic block diagram illustrating the configuration of an optical disc apparatus to which a playback restricting method according to an exemplary embodiment of the present invention is applied.

Accordingly, in the case of an optical disc apparatus adapted to play back a BD-ROM or BD-R recorded with the above described physical mark information, for example, a BD-ROM player including an optical pickup 20, a VDP system 21, and a D/A converter 22, as shown in FIG. 8, the BD-ROM player detects and identifies the physical mark information at the initial stage of a typical servo operation thereof carried out when an optical disc is loaded, detects and identifies the unique format of data read out from the data area of the optical disc during a data reproduction operation thereof, thereby determining whether or not the data was illegally duplicated on the optical disc, so as to perform a playback restricting operation by stopping playback of the optical disc in accordance with the result of the determination. These operations will be described in detail hereinafter.

Figure 9A:
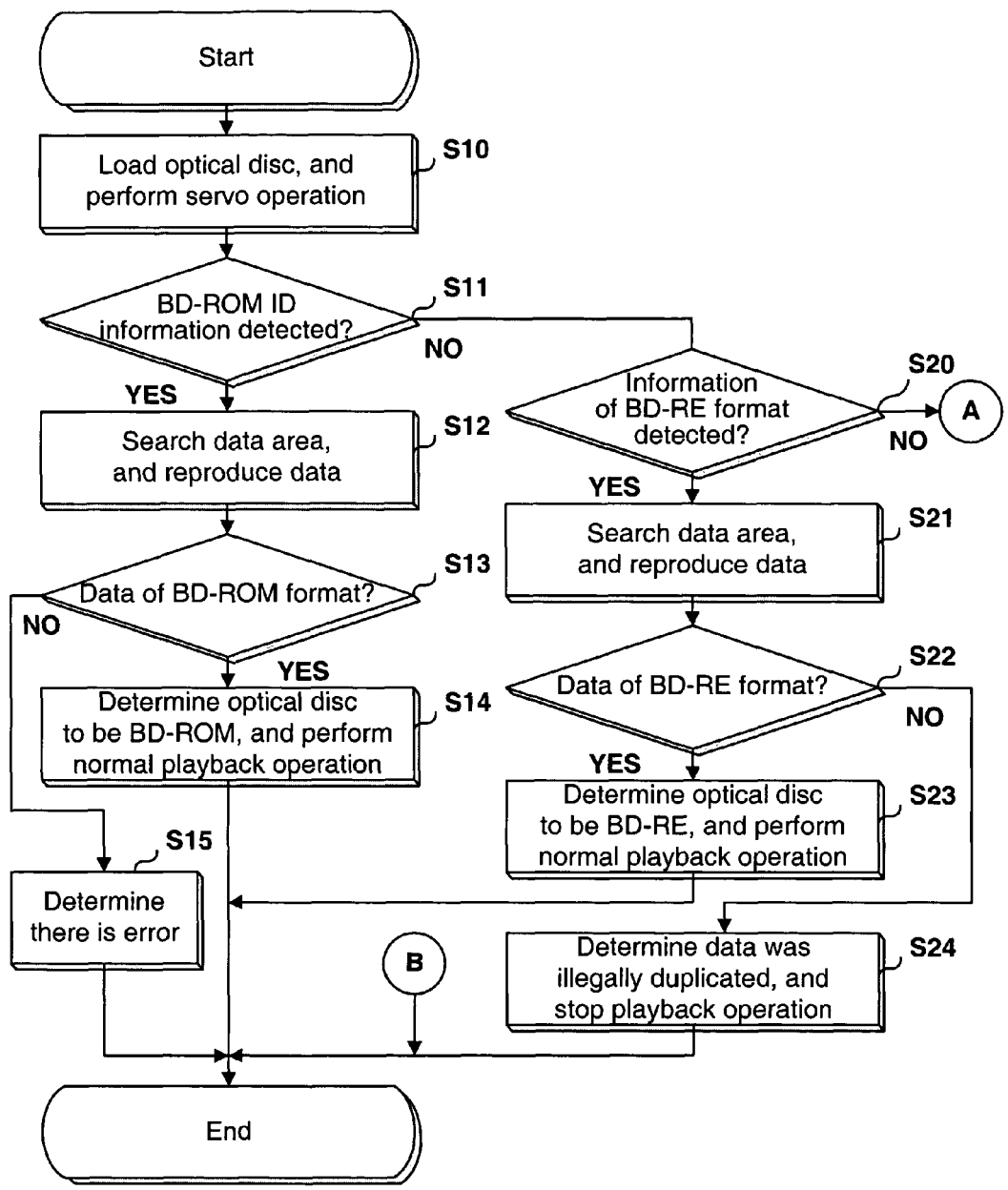
FIGS. 9a and 9b are flow charts illustrating sequential processes of the playback restricting method carried out in the optical disc apparatus in accordance with an exemplary embodiment of the present invention.
Figure 9B:
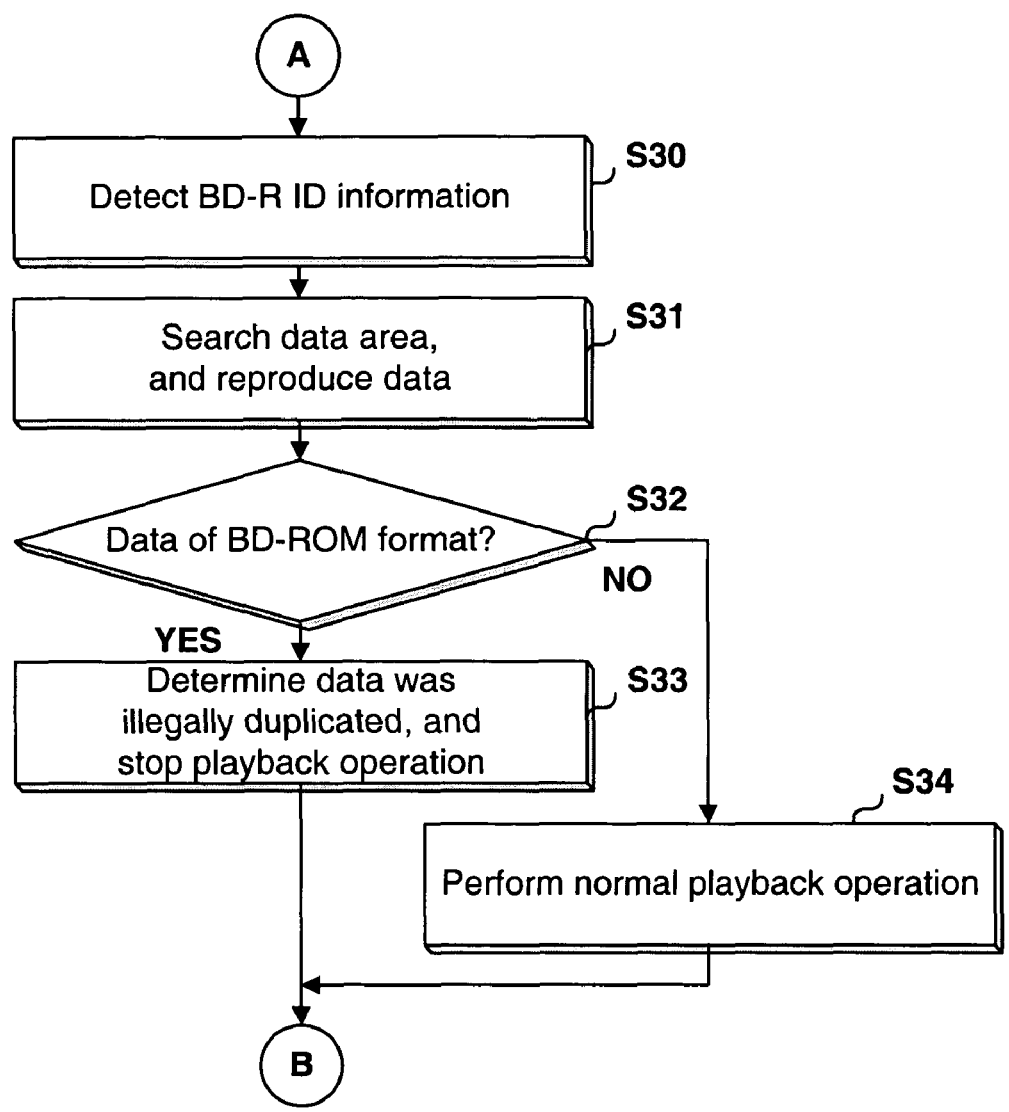

FIGS. 9*a* and 9*b* are flow charts illustrating a method for restricting playback of an optical disc in an optical disc apparatus in accordance with an exemplary embodiment of the present invention.

In the optical disc apparatus shown in FIG. 8, a typical focusing and tracking servo operation is carried out by the VDP system 21 when an optical disc is loaded in the optical disc apparatus (S10), as shown in FIG. 9*a*.

At the initial stage of the servo operation, the VDP system 21 accesses a disc identification area preceding a lead-in area, in the data area, in the lead-out area, or in an area following the lead-out area of the information area of the optical disc, to detect and identify physical mark information recorded in the disc identification area. For example, where it is determined that the physical mark information corresponds to ID information associated with BD-ROM (S11), the VDP system 21 determines that the loaded optical disc is a BD-ROM.

Subsequently, the VDP system 21 searches a data area assigned to an information area of the optical disc, and performs a data reproduction operation for reading out data recorded in the data area, and reproducing the read-out data (S12). Where the data read out in the above described procedure has a format unique to BD-ROM, that is, the read-out data is BD-ROM format data (S13), the VDP system 21 determines the loaded disc to be a normal BD-ROM, and continues the data reproduction (playback) operation (S14).

On the other hand, where the read-out data does not have the format unique to BD-ROM, that is, it is not BD-ROM format data, the VDP system 21 determines that there is an error in determining the type of the optical disc (S15). In this case, the VDP system 21 stops the data reproduction (playback) operation or performs the disc determining operation again.

Where the physical mark information recorded in the disc identification area does not correspond to BD-ROM ID information, for example, where information recorded in accordance with a format unique to BD-RE is detected (S20), the VDP system determines the loaded optical disc to be BD-RE.

The VDP system 21 searches the data area assigned to the information area, and then performs a data reproduction operation for reading out data recorded in the data area, and reproduces the read-out data (S21). Where the data read out has a format unique to BD-RE, that is, the read-out data is BD-RE format data (S22), the VDP system 21 determines the loaded optical disc to be a normal BD-RE, and continues the data reproduction (playback) operation (S23).

On the other hand, where the read-out data does not have the format unique to BD-RE, for example, where it is BD-ROM format data, the VDP system 21 determines that BD-ROM data was illegally duplicated on a BD-RE, and displays a report message, while performing a playback restricting operation to stop the data reproduction operation (S24).

Where BD-R ID information is detected from the physical mark information recorded in the disc identification area (S30), the VDP system 21 determines the loaded optical disc to be BD-R. In this case, the VDP system 21 searches the data area assigned to the information area, and then performs a data reproduction operation for reading out data recorded in the data area, and reproducing the read-out data (S31).

Where it is subsequently determined that the data read out has a format unique to BD-ROM, that is, the read-out data is BD-ROM format data (S32), the VDP system 21 determines that BD-ROM data was illegally duplicated on a BD-R, and displays a report message, while performing a playback restricting operation to stop the data reproduction operation (S33).

On the other hand, where the read-out data does not have the format unique to BD-ROM, for example, where it is BD-RE format data or BD-R format data, the VDP system 21 determines that the loaded optical disc is a normal BD-R, and continues the data reproduction operation (S34).

Further, although BD-ROM format data is recorded in the data area of a BD-R disc, separate copyright allowance information may additionally be recorded, and a normal data reproduction operation can be carried out if it can be determined that duplication of data was authorized, based on the copyright allowance information.

As apparent from the above description, exemplary embodiments of the present invention provide a high-density, optical disc, such as BD-ROM, capable of preventing unauthorized duplication of data streams, written thereon, onto a BD-RE or BD-R, and a method for restricting playback of high-density optical discs duplicated illegally in an optical disc apparatus.

Although the exemplary embodiments of the invention have been disclosed for illustrative purposes, those skilled in the art will appreciate that various modifications, additions and substitutions are possible, without departing from the scope and spirit of the invention as disclosed in the accompanying claims.

We claim:

1. A method of forming a recording medium, comprising:
    forming an information area for recording disc management information and/or data;
    recording disc identification information identifying a type of computer readable medium in an area preceding the lead-in area, the type being selected from a set of media types, the set of media types including Read-Only, Recordable and Rewritable type; and
    the disc identification information being formed as a physical mark, the physical mark being a pit type, the pit type selected from at least one of wobbled pits and straight pits, wherein the physical mark provides control information for controlling a reproduction of data recorded as straight pits on a data area of the recording medium and is formed along a modulated unique pattern, wherein if the pit type is wobbled pits, at least a part of the wobbled pits forming the physical mark is shifted from a central line of the wobbled pits, and wherein the modulated unique pattern represents encryption information used in encrypting data of the data area.

2. The method of claim 1, wherein the physical mark is formed on a position of the recording medium being detectable at an initial stage of a servo operation carried out in an optical disc apparatus, separately from a decoding operation to be carried out in the optical disc apparatus.

3. The method of claim 1, further comprising:
    recording copy management information indicating whether duplication of the data is allowed on the recording medium.

4. The method of claim 1, wherein the pit type selected from at least one of wobbled pits and straight pits is based on a type of the recording medium.

5. A method of reproducing data from a recording medium, including a lead-in area, a data area and a lead-out area, comprising:
    detecting physical mark information recorded as a pit type from an area preceding the lead-in area, the physical mark information representing disc identification information identifying a type of computer readable medium, the pit type having been selected from at least one of wobbled pits and straight pits in the area preceding the lead-in area that is not writable by end user recorders, the type being selected from a set of media types, the set of media types including one of Read-Only, Recordable and Rewritable type, the physical mark information being formed along a modulated unique pattern, wherein if the pit type was wobbled pits, at least a part of the wobbled pits forming the physical mark information is shifted from a central line of the wobbled pits; and
    controlling a reproduction of data recorded as straight pits from the data area based on the detected physical mark information.

6. The method of claim 5, wherein the controlling step controls the reproduction by utilizing the detected physical mark information formed along the modulated unique pattern which represents encryption information used in encrypting data of the data area.

7. The method of claim 6, wherein the controlling step further controls a reproduction of a recording medium by utilizing copy management information recorded on the recording medium indicating whether duplication of data is allowed in such a manner that the reproduction is performed if the duplication is allowed.

8. An apparatus for reproducing data from a recording medium including a lead-in area, a data area and a lead-out area, comprising:
    an optical pickup configured to detect physical mark information recorded as a pit type from an area preceding the lead-in area, the physical mark information representing disc identification information identifying a type of recording medium, the pit type selected from at least one of wobbled pits and straight pits in the area preceding the lead-in area that is not writable by end user recorders, the type being selected from a set of media types, the set of media types including one of Read-Only, Recordable and Rewritable type, the physical mark information being formed along a modulated unique pattern, wherein if the pit type is wobbled pits, at least a part of the wobbled pits forming the physical mark information is shifted from a central line of the wobbled pits; and
    a controller configured to control a reproduction of data recorded as straight pits from the data area based on the detected physical mark information.

9. The apparatus of claim 8, wherein the controller is configured to control the reproduction by utilizing the detected physical mark information formed along the modulated unique pattern which represents encryption information used in encrypting data of the data area.

10. The apparatus of claim 9, wherein the controller is configured to control the optical pickup to reproduce data based on copy management information recorded on a medium, the copy management information indicating whether duplication of data is allowed.

11. A method of forming a recording medium, comprising:
    forming an information area for recording disc management information and/or data; and
    forming physical mark information as a pit type, the pit type selected from at least one of wobbled pits and straight pits in an area preceding a lead-in area of the recording medium, wherein the physical mark information provides control information for controlling a reproduction of data recorded as straight pits on a data area of the recording medium and is formed along a modulated unique pattern, wherein if the pit type selected is wobbled pits, at least a part of the wobbled pits forming the physical mark information wobble in a non-overlapping manner with respect to a central line of the wobbled pits, and wherein the modulated unique pattern represents encryption information used in encrypting data of the data area, the physical mark information identifying a type of the recording medium, the type being selected from a set of media types, the set of media types including one of Read-Only, Recordable and Rewritable type.

12. The method of claim 11,
    wherein the pit type selected from at least one of wobbled pits and straight pits is based on the type of the recording medium.

* * * * *